United States Patent
Mednik

(10) Patent No.: US 9,041,313 B2
(45) Date of Patent: May 26, 2015

(54) LOW DROPOUT LIGHT EMITTING DIODE (LED) BALLAST CIRCUIT AND METHOD THEREFOR

(71) Applicant: Microchip Technology, Inc., Chandler, AZ (US)

(72) Inventor: Alexander Mednik, Campbell, CA (US)

(73) Assignee: Microchip Technology Inc., Chandler, AZ (US)

( * ) Notice: Subject to any disclaimer, the term of this patent is extended or adjusted under 35 U.S.C. 154(b) by 0 days.

(21) Appl. No.: 13/871,360

(22) Filed: Apr. 26, 2013

(65) Prior Publication Data
US 2014/0320037 A1    Oct. 30, 2014

(51) Int. Cl.
H05B 37/02    (2006.01)
G05F 1/10     (2006.01)
H05B 33/08    (2006.01)

(52) U.S. Cl.
CPC ................... *H05B 33/0815* (2013.01)

(58) Field of Classification Search
USPC ............... 323/273–275, 311–316, 350, 353; 327/538; 315/240, 307
See application file for complete search history.

(56) References Cited

U.S. PATENT DOCUMENTS 6,873,203 B1 *  3/2005  Latham et al. ............... 327/538
6,989,659 B2 *  1/2006  Menegoli et al. ............ 323/274

* cited by examiner

*Primary Examiner* — Vibol Tan
(74) *Attorney, Agent, or Firm* — Burr & Forman LLP; Ryan M. Corbett

(57) ABSTRACT

A ballast circuit for a Light Emitting Diode (LED) has a regulator element coupled to the LED and to an input voltage source. A control circuit is coupled to the LED and to an input voltage source. A first switching device is coupled in series with the regulator element. A second switching device is coupled to the input voltage and the control circuit.

10 Claims, 2 Drawing Sheets

LOW DROPOUT LIGHT EMITTING DIODE (LED) BALLAST CIRCUIT AND METHOD THEREFOR

RELATED APPLICATIONS

The present patent application is related to U.S. Provisional Application Ser. No. 61/649,831, filed May 21, 2012, in the name of the same inventor listed above, and entitled, "LOW DROPOUT LED BALLAST". The present patent application claims the benefit under 35 U.S.C. §119(e)

TECHNICAL FIELD

The present invention relates generally to a Light Emitting Diodes (LEDs) and, more specifically, to an LED ballast circuit which can operate with a voltage dropout lower than presently available.

BACKGROUND

Recent developments of high-brightness light emitting diodes (LED) have opened new horizons in lighting. Highly efficient and reliable LED lighting continuously wins recognition in various areas of general lighting, especially in areas where cost of maintenance is a concern. LEDs are being adopted in a wide variety of electronics applications, for example, architectural lighting, automotive head and tail lights, backlights for liquid crystal display devices including personal computers and high definition TVs, flashlights, etc. Compared to conventional lighting sources such as incandescent lamps and fluorescent lamps, LEDs have significant advantages, including high efficiency, good directionality, color stability, high reliability, long life time, small size, and environmental safety.

Referring to FIG. 1, a prior art LED ballast circuit 100 (hereinafter ballast circuit 100) is shown. The ballast circuit 100 may be used with a linear or switching power supply for powering a string of light emitting diodes (LED) 102 from an input voltage source 101. The ballast circuit 100 includes a regulator element 111, linear or switching, and a control circuit 110, where the control circuit 110 is powered from the voltage that develops across the regulator element 111. A resistor 109 represents total parasitic series resistance. An example of such resistance 109 in a switching regulator is the DC resistance of the magnetic coil. The resistor 109, generally speaking, may also include dynamic impedance of the LED string 102. The minimum voltage dropout across the ballast circuit 100 is therefore limited to the minimum voltage necessary for operation of the control circuit 110.

Therefore, it would be desirable to provide a system and method that overcomes the above.

SUMMARY

This summary is provided to introduce a selection of concepts in a simplified form that are further described below in the DESCRIPTION OF THE APPLICATION. This summary is not intended to identify key features of the claimed subject matter, nor is it intended to be used as an aid in determining the scope of the claimed subject matter.

In accordance with one aspect of the present application, a ballast circuit for a Light Emitting Diode (LED) is disclosed. The ballast circuit has a regulator element coupled to the LED and to an input voltage source. A control circuit is coupled to the LED and to an input voltage source. A first switching device is coupled in series with the regulator element. A second switching device is coupled to the input voltage and the control circuit in accordance with another aspect of the present application, a ballast circuit for a Light Emitting Diode (LED) is disclosed. The ballast circuit has a regulator element coupled to the LED and to an input voltage source. A control circuit is coupled to the LED and to an input voltage source. A first switching device is coupled in series with the regulator element, wherein the first switching device is a transistor. A second switching device is coupled to the input voltage and the control circuit. A switching control circuit is provided for controlling the first switching device, wherein the switching control circuit comprises a comparator having one input coupled to a reference voltage, a second input coupled to the second switching element, and an output coupled to the first switching device.

In accordance with another aspect of the present application, a method for providing a lower voltage dropout for a ballast circuit for a Light Emitting Diode (LED) comprising: providing a capacitive element to power a control circuit of the ballast circuit; charging the capacitive element to a voltage higher than a dropout voltage of a regulator element of the ballast circuit; and discharging the capacitive element.

The features, functions, and advantages may be achieved independently in various embodiments of the disclosure or may be combined in yet other embodiments.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

DESCRIPTION OF THE APPLICATION

The description set forth below in connection with the appended drawings is intended as a description of presently preferred embodiments of the application and is not intended to represent the only forms in which the present application can be constructed and/or utilized. The description sets forth the functions and the sequence of steps for constructing and operating the application in connection with the illustrated embodiments. It is to be understood, however, that the same or equivalent functions and sequences can be accomplished by different embodiments that are also intended to be encompassed within the spirit and scope of this application.

Figure 1:
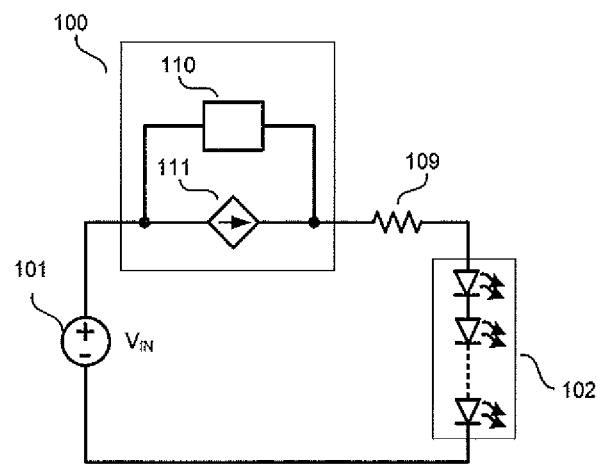
FIG. 1 is a simplified schematic of a prior art LED ballast circuit.
Figure 2:
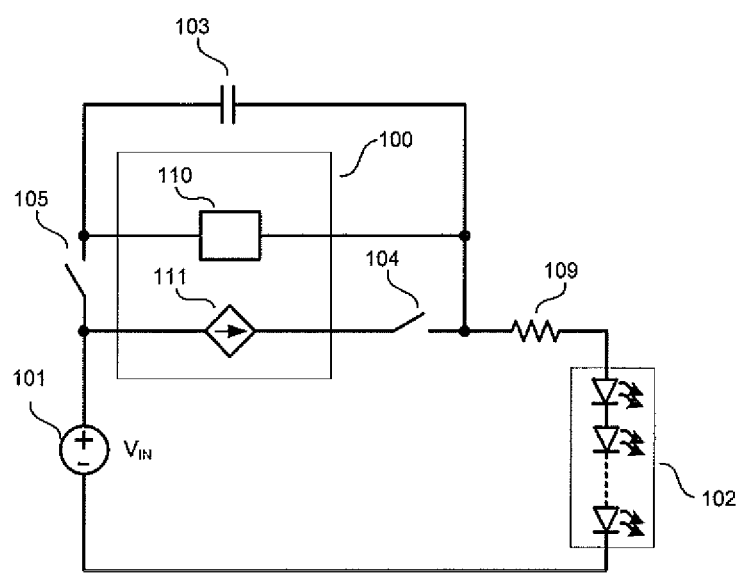
FIG. 2 is a simplified schematic of an LED ballast circuit of the present invention.

Referring to FIG. 2, an LED ballast circuit 200 of the present invention is shown. In the ballast circuit 200, the regulator element 111 may be connected in series with a switch 104, and the control circuit 110 may be powered via a switch 105. A holdup capacitor 103 may be connected to power the control circuit 110 when switch 105 is turned off. The switches 104 and 105 turn on and off repeatedly, such that the switch 104 is on when the switch 105 is off, and vice versa. When the switch 104 turns off, the voltage across the LED string 102 and the parasitic resistance 109 drops. The capacitor 103 is charged to a voltage higher than the dropout voltage of the regulator element 111. Hence, the circuit of FIG. 2 can operate with a voltage dropout lower than the circuit of FIG. 1. The switch 104 can be implemented inherently by switching the regulator element 111 off.

Figure 3:
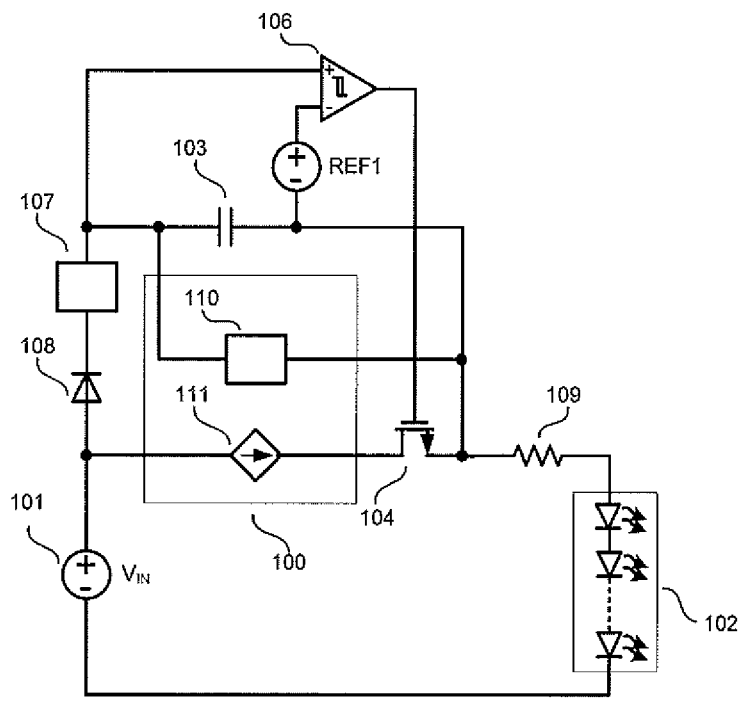
FIG. 3 depicts one implementation of the LED ballast circuit depicted in FIG. 2.

Referring now to FIG. 3, one implementation of the circuit of FIG. 2 is shown. The operation of the circuit of FIG. 3 is illustrated by the waveforms show in FIG. 4. In FIG. 3, the switch 104 is represented by a transistor 104A. In accordance with one embodiment, the transistor 104A may be a field-effect transistor. In the present embodiment, the switch 105 may be represented by a diode 108. Alternatively, the diode 108 can be followed by a voltage regulator 107, controlling the voltage at the holdup capacitor 103 at a programmed level. The LED ballast circuit of FIG. 3 may further comprise a comparator 106 with a reference voltage REF1 and input voltage hysteresis.

Figure 4:
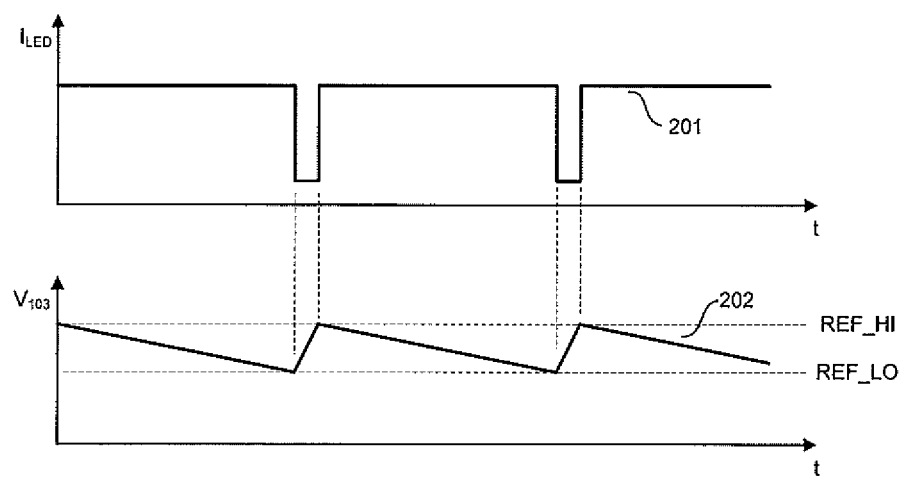
FIG. 4 shows operational waveforms for the LED ballast circuit depicted in FIG. 3.

Referring to the FIG. 4, a waveform 201 represents current in the LED string 102, and a waveform 202 represents voltage at the capacitor 103. The output of the comparator 106 controls the switch 104 such that the capacitor 103 is charged to a programmed level REF_HI while the switch 104 is off, and capacitor 103 is discharged to a programmed level REF_LO while the switch 104 is on.

While embodiments of the disclosure have been described in terms of various specific embodiments, those skilled in the art will recognize that the embodiments of the disclosure may be practiced with modifications within the spirit and scope of the claims.

What is claimed is:

1. A ballast circuit for a Light Emitting Diode (LED) comprising:
   a regulator element coupled to the LED and to an input voltage source;
   a control circuit coupled to the LED and to the input voltage source;
   a first switching device coupled in series with the regulator element;
   a second switching device coupled to the input voltage source and the control circuit; and
   a switching control circuit coupled to the first switching device,
   wherein the switching control circuit comprises a comparator having one input coupled to a reference voltage, a second input coupled to the second switching element, and an output coupled to the first switching device.

2. The ballast circuit for a Light Emitting Diode (LED) in accordance with claim 1, further comprising a capacitive element to power the control circuit when the second switching device is turned off.

3. The ballast circuit for a Light Emitting Diode (LED) in accordance with claim 1, wherein the first switching device is a field effect transistor.

4. The ballast circuit for a Light Emitting Diode (LED) in accordance with claim 1, wherein the second switching element is a diode.

5. The ballast circuit for a Light Emitting Diode (LED) in accordance with claim 4, further comprising a voltage regulator coupled to the diode.

6. A ballast circuit for a Light Emitting Diode (LED) comprising:
   a regulator element coupled to the LED and to an input voltage source;
   a control circuit coupled to the LED and to the input voltage source;
   a first switching device coupled in series with the regulator element, wherein said first switching device is a transistor;
   a second switching device coupled to the input voltage source and the control circuit; and
   a switching control circuit for controlling the first switching device, wherein the switching control circuit comprises a comparator having one input coupled to a reference voltage, a second input coupled to the second switching element, and an output coupled to the first switching device.

7. The ballast circuit for a Light Emitting Diode (LED) in accordance with claim 6, further comprising a capacitive element to power the control circuit when the second switching device is turned off.

8. The ballast circuit for a Light Emitting Diode (LED) in accordance with claim 6, wherein the second switching element is a diode.

9. The ballast circuit for a Light Emitting Diode (LED) in accordance with claim 8, further comprising a voltage regulator coupled to the diode.

10. A method for providing a lower voltage dropout for a ballast circuit for a Light Emitting Diode (LED) comprising:
    providing a capacitive element to power a control circuit of the ballast circuit;
    coupling a first switching device coupled in series with a regulator element of the ballast circuit;
    coupling a second switching device to an input voltage of the ballast circuit and the control circuit;
    closing the second switching device to charge the capacitive element to a voltage higher than a dropout voltage of the regulator element of the ballast circuit; and
    closing the first switching device while the second switching device is open to discharge the capacitive element.

* * * * *